United States Patent
Montanez, Jr.

[11] Patent Number: 6,065,893
[45] Date of Patent: May 23, 2000

[54] LOCKABLE WHEEL ASSEMBLY

[76] Inventor: Sixto Montanez, Jr., 1500 E. Wilson St., N. Las Vegas, Nev. 89030

[21] Appl. No.: 09/127,570

[22] Filed: Jul. 31, 1998

[51] Int. Cl.[7] .............................. F16D 1/06; B60B 27/00
[52] U.S. Cl. ............................................ 403/1; 192/69.43
[58] Field of Search .................. 403/1; 301/1; 192/69.4, 192/69.43; 180/247

[56] References Cited

U.S. PATENT DOCUMENTS

| | | | |
|---|---|---|---|
| 2,439,012 | 4/1948 | Ledford | 301/1 |
| 2,455,216 | 11/1948 | Blanton | 301/1 X |
| 3,017,207 | 1/1962 | Lloyd | 287/53 |
| 3,637,243 | 1/1972 | Kitano et a l. | 287/53 |
| 4,089,610 | 5/1978 | Kleespies et al. | 403/1 |
| 4,337,003 | 6/1982 | Juhl | 403/1 |
| 4,437,553 | 3/1984 | Geisthoff | 192/46 |
| 4,555,197 | 11/1985 | Erickson | 403/1 |
| 4,610,558 | 9/1986 | Erickson | 403/1 |
| 4,621,723 | 11/1986 | Carlson | 192/71 |
| 4,856,633 | 8/1989 | Specht | 403/1 X |
| 5,279,402 | 1/1994 | Beigang | 192/57 |
| 5,333,711 | 8/1994 | Belgang | 192/71 |
| 5,429,204 | 7/1995 | Tuholski | 180/247 |

*Primary Examiner*—Rodney H. Bonck
*Attorney, Agent, or Firm*—Joseph N. Breaux

[57] ABSTRACT

A lockable wheel assembly that is attachable to a vehicle wheel rotor in place of an existing vehicle wheel when towing is necessary that free wheels with respect to the wheel rotor in a first configuration and that is lockable with respect to the wheel rotor in a second configuration so that the vehicle can be driven short distances without replacing the vehicle wheels.

2 Claims, 3 Drawing Sheets

LOCKABLE WHEEL ASSEMBLY

TECHNICAL FIELD

The present invention relates to vehicle wheels and more particularly a lockable wheel assembly that is attachable to a wheel rotor of an existing vehicle that rotates freely with respect to the vehicle wheel rotor when in an unlocked configuration for towing and that can be locked with a power transfer plate subassembly so that the vehicle wheel rotor can drive the wheel for short distances such as to park the towed vehicle for storage; the lockable wheel assembly including an axle subassembly securable to the wheel rotor of a vehicle, a free wheeling rim assembly rotatably mountable on the axle subassembly, and a power transfer plate subassembly attachable between the free wheeling rim assembly and the axle subassembly; the axis subassembly including a rotor attachment assembly having an attachment plate and a screw on rim securing plate; the attachment plate including a number of lug connecting apertures and a rim bearing axle extending away from the center thereof having a threaded first end portion including a threaded locking aperture provided therein; the screw on rim securing plate being screwable onto the threaded first end portion of the rim bearing axle and including a raised adapter key structure and a securing plate locking screw; the securing plate locking screw being companionately threaded to engage the threaded locking aperture of the rim bearing axle; the free wheeling rim assembly including a rim center portion, a tire mounting channel extending around the perimeter of the rim center portion, a rotatable rim bearing positioned through the center of the rim center portion, and at least one threaded transfer plate attachment aperture formed into an outer rim surface of the rim center portion; the rotatable rim bearing having a cylindrical rim axle passageway sized to receive therethrough the rim bearing axle; the power transfer plate subassembly including a center key engaging plate and at least one connecting arm extending radially from the center key engaging plate; the center key engaging plate including a keyway shaped to receive and engage the raised adapter key structure of the rim securing plate; the at least one connecting arm having a thumbscrew positioned through a thumbscrew aperture, the thumbscrew being companionately threaded to engage the at least one threaded transfer plate attachment aperture formed into the outer rim surface, the thumbscrew aperture being simultaneously positionable in registration with the threaded transfer plate attachment aperture when the raised adapter key structure of the rim securing plate is received in and engaged with the keyway formed through the center key engaging plate.

BACKGROUND ART

It is often desirable to tow a vehicle to a destination for use upon arrival, such as when towing a small car behind a large recreational vehicle. Although towing the vehicle to the destination is desirable, rotation of the wheels during towing can cause undesirable wear and tear on the drive train of the vehicle being towed. It would be desirable, therefore, to have lockable wheel assemblies that could be attached to two or more of the vehicle wheel rotors in place of the existing vehicle wheels when towing is necessary wherein each of the lockable wheel assemblies free wheels with respect to the wheel rotor in a first configuration and that is lockable in a second configuration so that the vehicle can be driven short distances without replacing the vehicle wheels.

GENERAL SUMMARY DISCUSSION OF INVENTION

It is thus an object of the invention to provide a lockable wheel assembly that is attachable to a vehicle wheel rotor in place of an existing vehicle wheel when towing is necessary that free wheels with respect to the wheel rotor in a first configuration and that is lockable with respect to the wheel rotor in a second configuration so that the vehicle can be driven short distances without replacing the vehicle wheels.

It is a further object of the invention to provide a lockable wheel assembly that includes an axle subassembly securable to the wheel rotor of a vehicle, a free wheeling rim assembly rotatably mountable on the axle subassembly, and a power transfer plate subassembly attachable between the free wheeling rim assembly and the axle subassembly; the axle subassembly including a rotor attachment assembly having an attachment plate and a screw on rim securing plate; the attachment plate including a number of lug connecting apertures and a rim bearing axle extending away from the center thereof having a threaded first end portion including a threaded locking aperture provided therein; the screw on rim securing plate being screwable onto the threaded first end portion of the rim bearing axle and including a raised adapter key structure and a securing plate locking screw; the securing plate locking screw being companionately threaded to engage the threaded locking aperture of the rim bearing axle; the free wheeling rim assembly including a rim center portion, a tire mounting channel extending around the perimeter of the rim center portion, a rotatable rim bearing positioned through the center of the rim center portion, and at least threaded transfer plate attachment aperture formed into an outer rim surface of the rim center portion; the rotatable rim bearing having a cylindrical rim axle passageway sized to receive therethrough the rim bearing axle; the power transfer plate subassembly including a center key engaging plate and at least one connecting arm extending radially from the center key engaging plate; the center key engaging plate including a keyway shaped to receive and engage the raised adapter key structure of the rim securing plate; the at least one connecting arm having a thumbscrew positioned through a thumbscrew aperture, the thumbscrew being companionately threaded to engage the at least one threaded transfer plate attachment aperture formed into the outer rim surface, the thumbscrew aperture being simultaneously positionable in registration with the threaded transfer plate attachment aperture when the raised adapter key structure of the rim securing plate is received in and engaged with the keyway formed through the center key engaging plate.

It is a still further object of the invention to provide a lockable wheel assembly that accomplishes both of the above objects in combination.

Accordingly, a lockable wheel assembly is provided. The lockable wheel assembly includes an axle subassembly securable to a wheel rotor of a vehicle, a free wheeling rim assembly rotatably mountable on the axle subassembly, and a power transfer plate subassembly attachable between the free wheeling rim assembly and the axle subassembly; the axle subassembly including a rotor attachment assembly having an attachment plate and a screw on rim securing plate; the attachment plate including a number of lug connecting apertures and a rim bearing axle extending away from the center thereof having a threaded first end portion including a threaded locking aperture provided therein; the screw on rim securing plate being screwable onto the threaded first end portion of the rim bearing axle and including a raised adapter key structure and a securing plate locking screw; the securing plate locking screw being companionately threaded to engage the threaded locking aperture of the rim bearing axle; the free wheeling rim assembly including a rim center portion, a tire mounting channel extending around the perimeter of the rim center portion, a rotatable rim bearing positioned through the center of the rim center portion, and at least one threaded transfer plate attachment aperture formed into an outer rim surface of the rim center portion; the rotatable rim bearing having a cylindrical rim axle passageway sized to receive therethrough the rim bearing axle; the power transfer plate subassembly including a center key engaging plate and at least one connecting arm extending radially from the center key engaging plate; the center key engaging plate including a keyway shaped to receive and engage the raised adapter key structure of the rim securing plate; the at least one connecting arm having a thumbscrew positioned through a thumbscrew aperture, the thumbscrew being companionately threaded to engage the at least one threaded transfer plate attachment aperture formed into the outer rim surface, the thumbscrew aperture being simultaneously positionable in registration with the threaded transfer plate attachment aperture when the raised adapter key structure of the rim securing plate is received in and engaged with the keyway formed through the center key engaging plate.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
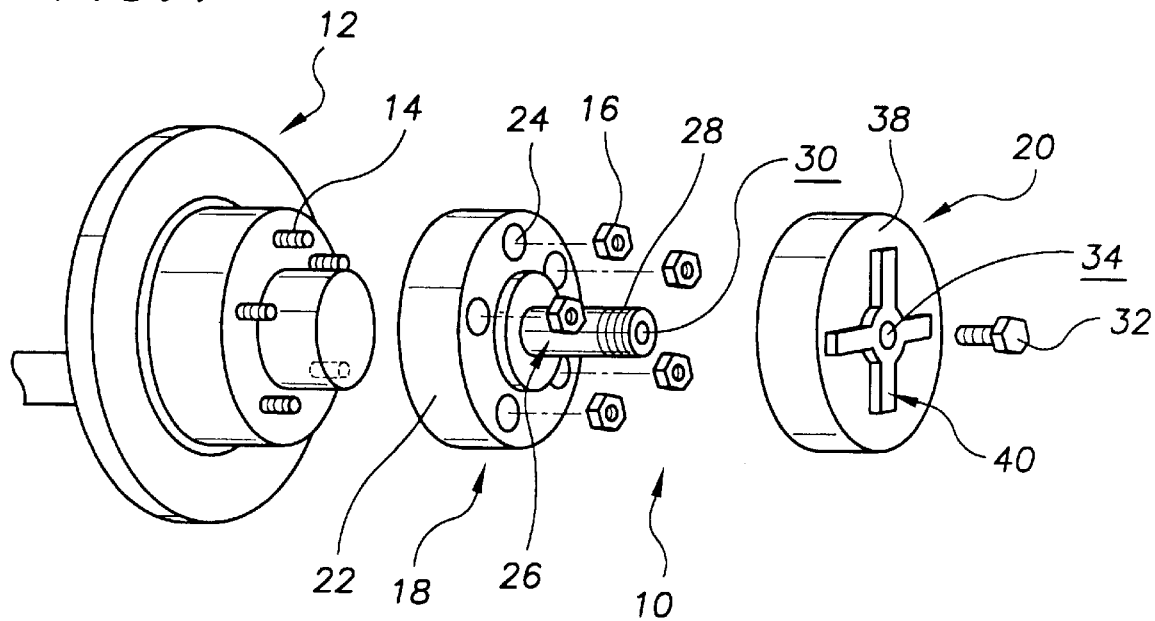
FIG. 1 is an exploded view of an exemplary embodiment of the axle subassembly of the lockable wheel assembly of the present invention and a representative wheel rotor of a vehicle; the axle subassembly including a rotor attachment assembly including an attachment plate including five lug connecting apertures and a rim bearing axle having a threaded first end portion having a threaded locking aperture provided therein, and a screw on rim securing plate including a raised adapter key structure and a securing plate locking screw companionately threaded to engage the threaded locking aperture of the rim bearing axle.
Figure 1A:
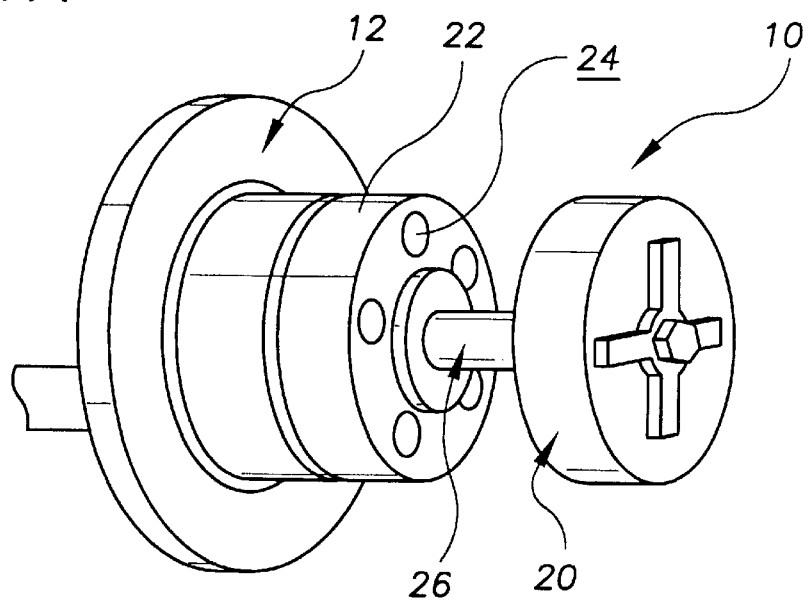
FIG. 1A is a perspective view showing the assembled axle subassembly of FIG. 1 with the rotor attachment assembly attached to the representative wheel rotor and the screw on rim securing plate screwed onto the threaded first end of the rim bearing axle and locked in place with the securing plate locking screw.

FIG. 1 shows an exemplary embodiment of the axle subassembly, generally designated 10, of the lockable wheel assembly of the present invention and a representative wheel rotor, generally designated 12, of a vehicle (not shown). Wheel rotor 12 is of conventional construction and has five lugs 14 and five lug nuts 16 for securing a conventional vehicle wheel to wheel rotor 12. Axle subassembly 10 includes a rotor attachment assembly, generally designated 18, and a screw on rim securing plate, generally designated 20. Rotor attachment assembly 18 includes a round attachment plate 22 having five lug connecting apertures 24 spaced around the perimeter thereof and a rim bearing axle, generally designated 26, extending away from the center thereof. Rim bearing axle 26 has a threaded first end portion 28 that terminates at a first end in a threaded locking aperture 30. With reference to FIG. 1A, attachment plate 22 is secured to wheel rotor 12 by positioning lugs 14 (FIG. 1) through the five lug connecting apertures 24 and then, with reference back to FIG. 1, screwing on lug nuts 16.

Screw on rim securing plate 20 screws onto threaded first end portion 28 and is lockable in connection with bearing axle 26 by a securing plate locking screw 32 that is positioned through a locking screw aperture 34 formed through screw on rim securing plate 20. Securing plate locking screw 32 is companionately threaded to engage threaded locking aperture 30 of rim bearing axle 26. Screw on rim securing plate 20 has an outwardly directed surface 38 from which a raised, X-shaped adapter key structure, generally designated 40, extends.

Figure 2:
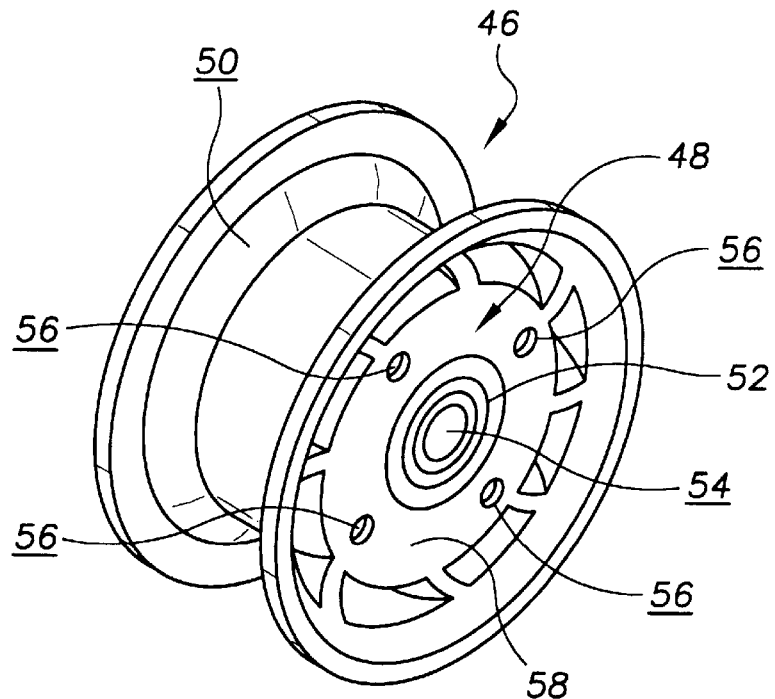
FIG. 2 is a perspective view of an exemplary embodiment of the free wheeling rim assembly of the lockable wheel assembly of the present invention showing the tire mounting channel extending around the perimeter of the rim center portion, the rotatable rim bearing with the cylindrical rim axle passageway fit through the center of the rim center portion, and the four threaded transfer plate attachment apertures formed into the outer rim surface of the rim center portion.

FIG. 2 shows an exemplary embodiment of the free wheeling rim assembly, generally designated 46, of the lockable wheel assembly of the present invention. Free wheeling rim assembly 46 includes a center rim portion, generally designated 48, a tire mounting channel 50 extending around the perimeter of rim center portion 48, a rotatable rim bearing 52 with a cylindrical rim axle passageway 54 fit through the center of rim center portion 48, and four threaded transfer plate attachment apertures 56 formed into an outer rim surface 58 of rim center portion 48. Rotatable rim bearing 52 spins freely in both directions with respect to rim center portion 48 and tire mounting channel 50. Tire mounting channel 50 is of conventional construction. Free wheeling rim assembly 46 is mounted on axle subassembly 10 (FIG. 1A) by inserting bearing axle 26 (FIGS. 1 and 1A) through cylindrical rim axle passageway 54 before attaching screw on rim securing plate 20 (FIGS. 1 and 1A) as previously described. In this configuration free wheeling rim assembly 46 rotates freely in both directions with respect to axle subassembly 10 (FIGS. 1 and 1A).

Figure 3:
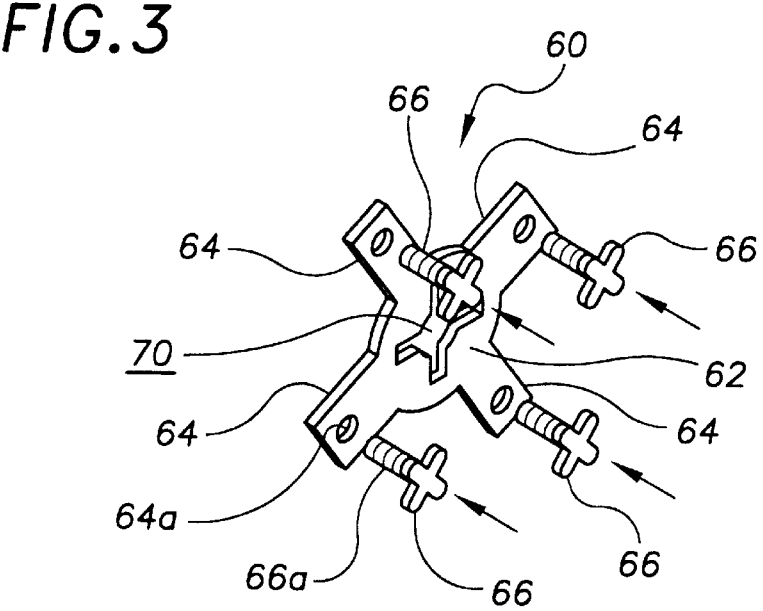
FIG. 3 is an exploded perspective view showing an exemplary embodiment of the power transfer plate subassembly of the lockable wheel assembly of the present invention showing the center key engaging plate including the keyway shaped to receive and engage receive the raised adapter key structure of the rim securing plate and the four connecting arms extending radially from the center key engaging plate, each connecting arm having a thumbscrew positioned through a thumbscrew aperture, each thumbscrew being companionately threaded to engage one of the four threaded transfer plate attachment apertures formed into the outer rim surface, the four thumbscrew apertures being simultaneously positionable in registration with the four threaded transfer plate attachment apertures.
Figure 4:
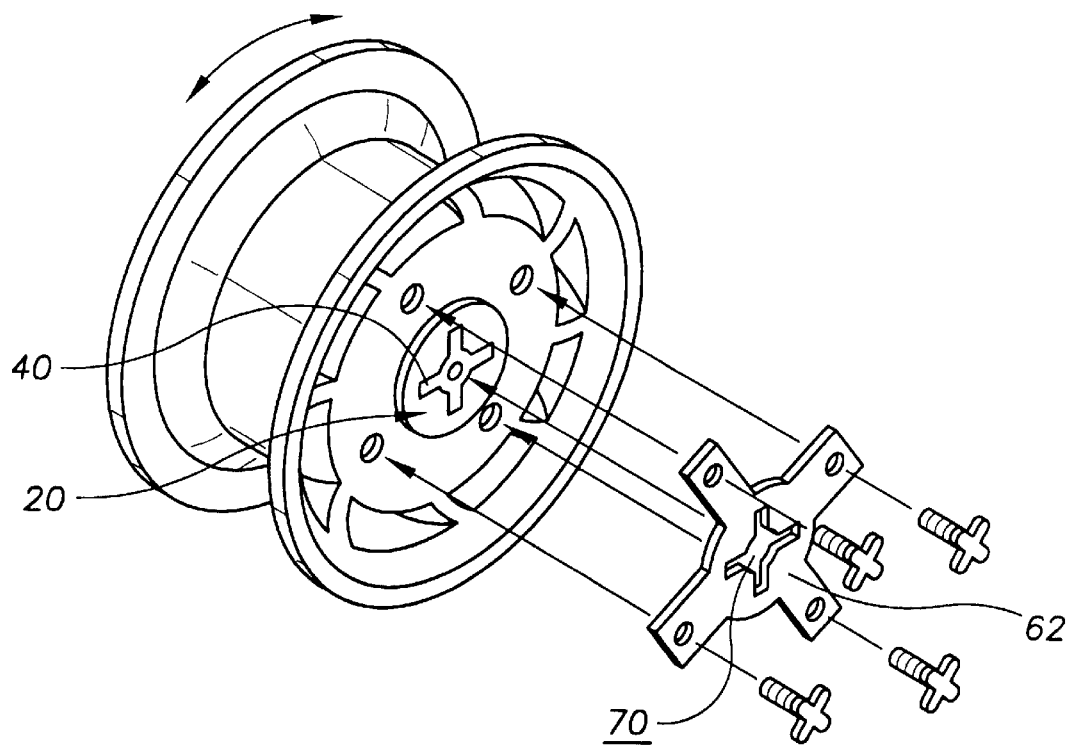
FIG. 4 is a partially exploded perspective view showing the free wheeling rim assembly rotatably mounted on the axle subassembly and the four thumbscrew apertures of the power transfer plate subassembly positioned in registration with the four threaded transfer plate attachment apertures.

FIG. 3 shows an exemplary embodiment of the power transfer plate subassembly, generally designated 60, of the lockable wheel assembly of the present invention that is used when it is desired to lock free wheeling rim assembly 46 (FIG. 2) with respect to axle subassembly 10 (FIGS. 1 and 1A). Power transfer plate assembly 60 includes a center key engaging plate 62, four connecting arms 64 each having a thumbscrew aperture 64a provided through an end thereof, and four threaded thumb screws 66 each having a threaded portion 66a that is positionable through a thumbscrew aperture 64a and companionately threaded to engage one of the four threaded transfer plate attachment apertures 56 (FIG. 2) formed into outer rim surface 58 (FIG. 2). With reference to FIG. 4, center key engaging plate 62 has an X-shaped keyway 70 formed therethrough that is shaped to receive and engage X-shaped, raised adapter key structure 40 of rim securing plate 20.

Figure 5:
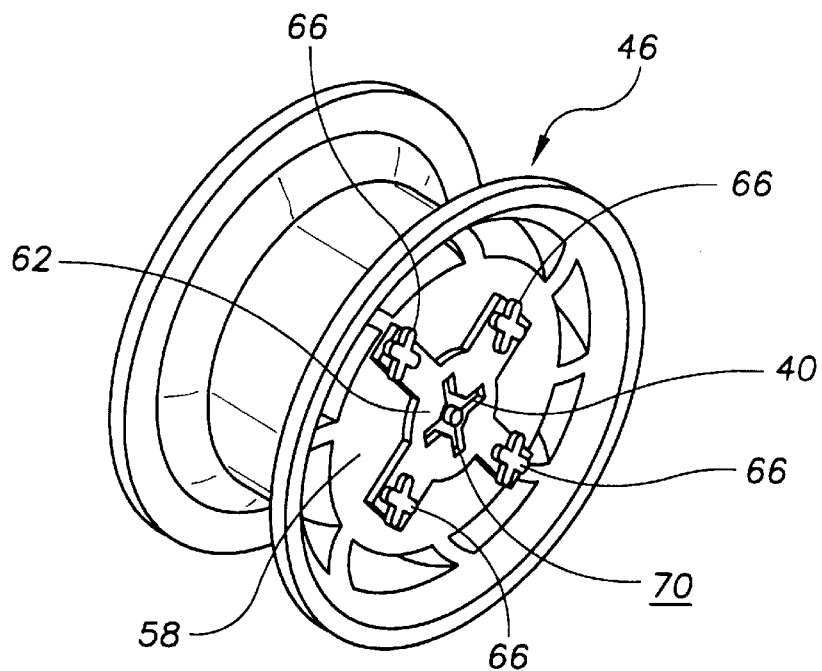
FIG. 5 is a perspective view showing the power transfer plate subassembly of FIG. 3 with the raised adapter key structure of the rim securing plate secured and positioned within the keyway of the center key engaging plate of the power transfer plate subassembly and the the threaded thumbscrews of the four connecting arms of the power transfer plate subassembly threaded into the four threaded transfer plate attachment apertures formed into the outer rim surface of the free wheeling rim assembly to the lock free wheeling rim assembly in driven connection with the vehicle wheel rotor through the axle subassembly.

With reference to FIG. 5, free wheeling rim assembly 46 is lockable with respect to axle subassembly 10 (FIGS. 1 and 1A) by inserting X-shaped, raised adapter key structure 40 of rim securing plate 20 (FIGS. 1 and 1A) into X-shaped keyway 70 of center key engaging plate 62 and screwing the threaded portions 66a (FIG. 3) of each thumbscrew 66 into one of the four threaded transfer plate attachment apertures 56 (FIG. 2) formed into outer rim surface 58.

It can be seen from the preceding description that a lockable wheel assembly has been provided that is attachable to a vehicle wheel rotor in place of an existing vehicle wheel when towing is necessary that free wheels with respect to the wheel rotor in a first configuration and that is lockable with respect to the wheel rotor in a second configuration so that the vehicle can be driven short distances without replacing the vehicle wheels; and that includes an axle subassembly securable to the wheel rotor of a vehicle, a free wheeling rim assembly rotatably mountable on the axle subassembly, and a power transfer plate subassembly attachable between the free wheeling rim assembly and the axle subassembly; the axle subassembly including a rotor attachment assembly having an attachment plate and a screw on rim securing plate; the attachment plate including a number of lug connecting apertures and a rim bearing axle extending away from the center thereof having a threaded first end portion including a threaded locking aperture provided therein; the screw on rim securing plate being screwable onto the threaded first end portion of the rim bearing axle and including a raised adapter key structure and a securing plate locking screw; the securing plate locking screw being companionately threaded to engage the threaded locking aperture of the rim bearing axle; the free wheeling rim assembly including a rim center portion, a tire mounting channel extending around the perimeter of the rim center portion, a rotatable rim bearing positioned through the center of the rim center portion, and at least one threaded transfer plate attachment aperture formed into an outer rim surface of the rim center portion; the rotatable rim bearing having a cylindrical rim axle passageway sized to receive therethrough the rim bearing axle; the power transfer plate subassembly including a center key engaging plate and at least one connecting arm extending radially from the center key engaging plate; the center key engaging plate including a keyway shaped to receive and engage the raised adapter key structure of the rim securing plate; the at least one connecting arm having a thumbscrew positioned through a thumbscrew aperture, the thumbscrew being companionately threaded to engage the at least one threaded transfer plate attachment aperture formed into the outer rim surface, the thumbscrew aperture being simultaneously positionable in registration with the threaded transfer plate attachment aperture when the raised adapter key structure of the rim securing plate is received in and engaged with the keyway formed through the center key engaging plate.

It is noted that the embodiment of the lockable wheel assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A lockable wheel assembly comprising:

an axle subassembly securable to a wheel rotor of a vehicle;

a free wheeling rim assembly rotatably mountable on said axle subassembly; and a power transfer plate subassembly that is attachable between said free wheeling rim assembly and said axle subassembly;

said axle subassembly including a rotor attachment assembly having an attachment plate and a screw on rim securing plate, said attachment plate including a number of lug connecting apertures and a rim bearing axle extending away from a center thereof having a threaded first end portion including a threaded locking aperture provided therein, said screw on rim securing plate being screwable onto said threaded first end portion of said rim bearing axle and including a raised adapter key structure and a securing plate locking screw, said securing plate locking screw being companionately threaded to engage said threaded locking aperture of said rim bearing axle;

said free wheeling rim assembly including a rim center portion, a tire mounting channel extending around a perimeter of said rim center portion, a rotatable rim bearing positioned through said center of said rim center portion, and at least one threaded transfer plate attachment aperture formed into an outer rim surface of said rim center portion, said rotatable rim bearing having a cylindrical rim axle passageway sized to receive therethrough said rim bearing axle;

said power transfer plate subassembly including a center key engaging plate and at least one connecting arm extending radially from said center key engaging plate; said center key engaging plate including a keyway shaped to receive and engage said raised adapter key structure of said rim securing plate, said at least one connecting arm having a thumbscrew positioned through a thumbscrew aperture, said thumbscrew being companionately threaded to engage said at least one threaded transfer plate attachment aperture formed into said outer rim surface, said thumbscrew aperture being simultaneously positionable in registration with said threaded transfer plate attachment aperture when said raised adapter key structure of said rim securing plate is received in and engaged with said keyway formed through said center key engaging plate.

2. The lockable wheel assembly of claim 1 wherein:

said keyway is X-shaped; and said raised adapter key structure is X-shaped.

\* \* \* \* \*